Aug. 7, 1962   R. L. MATLOCK   3,048,421
LONGITUDINALLY ADJUSTABLE RUNNING GEAR MOUNTING FOR VEHICLES
Filed July 21, 1960
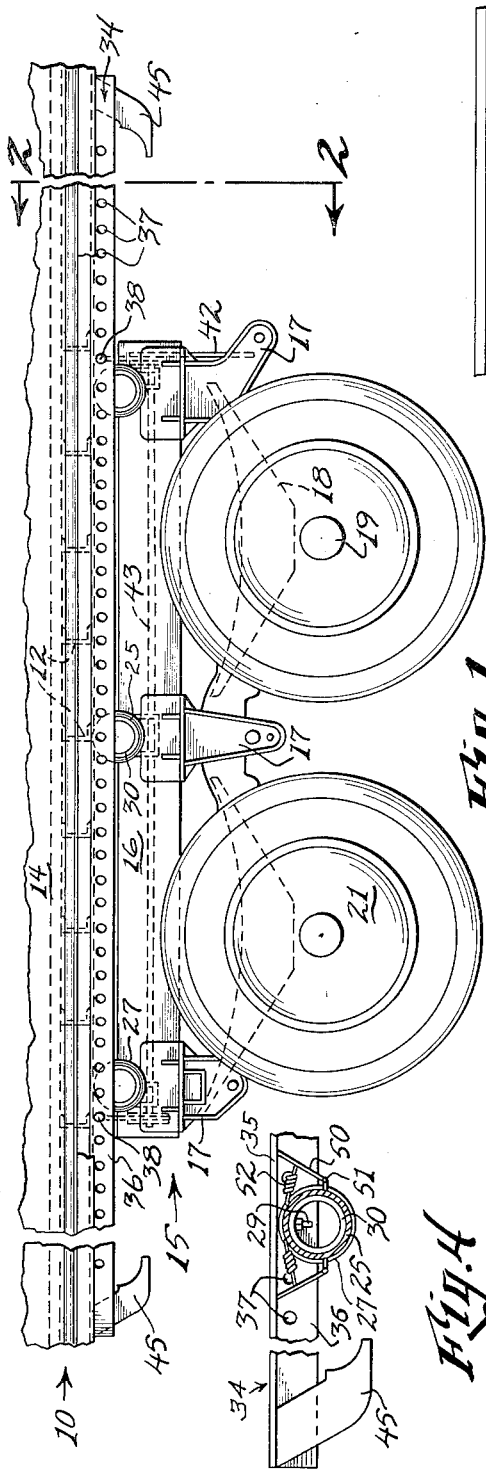
INVENTOR
*Roy L. Matlock*
BY
*Harrington A. Lackey*
ATTORNEY

United States Patent Office 3,048,421
Patented Aug. 7, 1962

3,048,421
LONGITUDINALLY ADJUSTABLE RUNNING
GEAR MOUNTING FOR VEHICLES
Roy L. Matlock, % Matlock & Cope, 151 Fairfield Ave.,
Nashville 10, Tenn.
Filed July 21, 1960, Ser. No. 44,512
3 Claims. (Cl. 280—81)

This invention relates to a wheel mounting for a vehicle and more particularly a wheel mounting which may be longitudinally adjustable with respect to the vehicle body.

One object of this invention is to provide a longitudinally adjustable wheel mounting for a vehicle body in which the wheel mounting is provided with roller bearings for engaging the bottom of the vehicle body.

Another object of this invention is to provide roller bearings of a novel structure mounted on the wheel supporting sub-frame of a vehicle to constantly support the full load of the vehicle main frame as well as being adapted to facilitate longitudinal adjustment of the relative positions of the main frame and sub-frame.

A further object of this invention is to provide a novel adjustable wheel mounting for a vehicle body in which the adjustable bearings between the wheel assembly and the vehicle body are located over the wheels and beneath the vehicle body but substantially within the outer edges of the vehicle body.

Further objects and advantages of the invention will be apparent from the following description taken in conjunction with the drawings, wherein:

FIG. 1 is a side elevation of the invention;
FIG. 2 is a section taken along the line 2—2 of FIG. 1;
FIG. 3 is an enlarged fragmentary rear elevation of the roller bearing, partly in section; and
FIG. 4 is a reduced section taken along the line 4—4 of FIG. 3.

Referring now to the drawings in more detail, FIGS. 1 and 2 disclose the rear and lower fragmentary portion of a trailer having a main frame 10 comprising a floor 11 mounted on transverse channel bars 12 and comprising a front wall 13 and side walls 14. Longitudinally adjustably supporting the main frame 10 is the wheel mounting or sub-frame 15 in the form of a rear tandem axle assembly. The sub-frame 15 comprises a pair of longitudinal channel beams 16, each of which is carried by a plurality of spring shackles 17, between which extend the leaf springs 18. Each leaf spring 18 is supported on its respective axle 19 by means of the clamps 20. Each axle 19 supports rear wheels 21 at its opposite ends in such a manner that the outer faces of the outer wheels are substantially flush with the outer faces of the side walls 14. The spring shackles 17 are laterally braced by means of transverse rods 22.

The parts previously described being conventional in the art, the structure and location of the novel mechanism for longitudinally adjusting the relative positions of the main frame 10 and the sub-frame 15 will now be described.

A transverse tubular member 25 of great strength is rigidly cradled in aligned recesses formed in the longitudinal channel beams 16 to form a roller support or roller axle. An annular recess 26 is formed adjacent each end of the tubular member 25 to form a race to receive a ring-like roller or roller bearing 27. The inner diameter of the roller 27 is slightly greater than the outer diameter of the race 26 in order that the roller 27 may rotate freely within the race 26, yet be constrained against lateral movement by means of the sides of the race 26. A lubricant 28, such as grease, is introduced into the space between the race 26 and the roller 27 by means of a grease fitting 29 formed through the bottom wall 30 of the race 26. As disclosed in FIG. 3, the bottom wall 30 of the race 26 is formed by means of a tubular collar force-fitted into the hollow end of the larger tubular member 25. The extreme end of the collar 30 is then capped by means of a ring 31 after the roller 27 is placed over the outside of the collar 30. It will be understood that the structure of the race 26 adjacent the end of the roller support 25 will not be limited to the particular construction previously described and disclosed in FIG. 3, but could consist of a single-piece cylindrical member 25 in which a recess is milled or otherwise formed to provide the race 26.

Longitudinal angle beams 34 are spaced parallel to each other and are mounted on the bottoms of the transverse channel bars 12 to provide horizontal bearing surfaces or tracks 35 for the rollers 27. The flanges 36 of the angle beams 34 depend from the main frame sufficiently to guide the beams 34 along the outer ends of the roller supports 25 so that there will be virtually no lateral displacement between the rollers 27 and the tracks 35, and consequently the main frame 10 and the sub-frame 15. Stops 45 are fixed to the tracks 35 to limit the relative longitudinal movement of the tracks on the rollers 27, as best disclosed in FIGS. 1 and 4.

Longitudinally spaced apertures 37 are provided in each depending flange 36 in order to receive a locking pin 38 in any desired longitudinal adjusted position. The locking pins 38 are a part of a conventional locking mechanism for trailer tandem assemblies comprising bearings 39 mounted on the roller support 25 to provide lateral reciprocable movement of the pins 38. The pins 38 are biased into any corresponding aperture 37 by means of a spring 40, and are adapted to be withdrawn from the apertures by means of a link 41 pivoted to one end of a handle 42, which in turn is rotatably mounted upon a cam shaft 43 longitudinally supported beneath the roller supports 25.

As best disclosed in FIG. 4, a pair of scraper blades 50 are pivotally mounted at 51 on opposite sides of the roller support 25 and are biased by means of springs 52 into scraping engagement with the track 35. When the main frame 10 moves in either direction relative to the sub-frame 15, both blades 50 will scrape mud, dirt and other debris from the moving track 35 to provide a smooth bearing surface for the rollers 27.

One important feature of this invention is the lateral location of the rollers 27 in respect to the main frame 10 and sub-frame 15. It will be noted that the longitudinal beams 16 are disposed above the axle 19 but between the inside rear wheels $21^1$. The beams 34 and the rollers 27 are purposely located above the wheels 21 and $21^1$ and outside the channel beams 16. Moreover, the beams 34 and rollers 27 are located substantially inside the outer faces of the side walls 14 of the trailer. As best disclosed in FIG. 2, each beam 34 and roller 27 is located substantially midway between the adjacent beam 16 and adjacent side wall 14. The purpose of locating the beams 34 and roller 27 substantially outside the beam 16 is to reduce the moment arm between the bearing of the sub-frame 15 supporting the main frame 10 and the outer edge of the main frame 10. In previously constructed adjustable tandem assemblies, the bearing support was in vertical alignment with the channel beam 16, in which case the moment arm would be about twice that disclosed between the beam 34 and the outer face of the side wall 14 in FIG. 2. The beam 34 and the roller 27 are located substantially inside the side wall 14 of the trailer in order to prevent the track 35 and the flange 36 from being exposed to damage from accidental external impact. FIG. 2 discloses the protected location of the beams 34 and the roller bearings 27.

It will be noted that the structure of the roller support 25 is sufficiently large and strong to support the rollers 27 as permanent bearings for the main frame or trailer body, and when the pins 38 are unlocked, the trailer body may be easily rolled with a minimum of friction to any longitudinal adjusted position relative to the sub-frame 15. Thus, a rolling tandem assembly made in accordance with this invention is far superior to any of the conventional sliding tandem assemblies heretofore made. Moreover, it is submitted that any slight disalignment in sliding members as opposed to the roller construction of this invention, would render the relative adjustment between the sub-frame and trailer body inoperative. On the other hand, slight bends in track 35 would not prevent the rollers 27 from operating to shift the relative positions of the main frame 10 and sub-frame 15.

It will be apparent to those skilled in the art that various changes may be made in the invention, without departing from the spirit and scope thereof, and therefore the invention is not limited by that which is shown in the drawings and described in the specification, but only as indicated in the appended claims.

What is claimed is:

1. An adjustable wheel mounting for a trailer comprising a main frame having side edges, a sub-frame comprising an axle carrying ground-engaging wheels at opposite ends thereof, and a roller support frame extending upward from said axle and between said wheels, parallel longitudinal tracks mounted on and beneath said main frame spaced substantially inside the side edges of said main frame and outside said roller support frame, a transverse beam rigidly fixed to said roller support frame and spanning the distance between said tracks, an annular race formed in and adjacent each end of said transverse beam in vertical alignment with each track, a roller bearing for each track comprising a loosely fitted ring surrounding and adapted to rotate within each race, means for lubricating the space between each race and its corresponding bearing, means for guiding each roller bearing in constant longitudinal rolling engagement with its corresponding track to provide a permanent longitudinally adjustable support for said trailer, and means for locking said sub-frame to said main frame in various relative longitudinally adjusted positions.

2. The invention according to claim 1 in which said guide means comprises a flange depending from the outside of each track.

3. The invention according to claim 2 in which said locking means comprises laterally extending and movable pins mounted on said sub-frame and longitudinally spaced apertures in said depending flanges to receive said pins in extended locking positions.

References Cited in the file of this patent

UNITED STATES PATENTS

| | | |
|---|---|---|
| 1,179,563 | Rigdon | Apr. 18, 1916 |
| 1,392,448 | Randall | Oct. 4, 1921 |
| 2,114,721 | Midgley | Apr. 19, 1938 |
| 2,831,735 | Bennett et al. | Apr. 22, 1958 |
| 2,832,610 | Tarte | Apr. 29, 1958 |
| 2,835,504 | Acker | May 20, 1958 |
| 2,869,710 | Stewart | Jan. 20, 1959 |

FOREIGN PATENTS

| | | |
|---|---|---|
| 1,170,612 | France | Sept. 22, 1958 |